United States Patent [19]

Bannai

[11] Patent Number: 5,055,860
[45] Date of Patent: Oct. 8, 1991

[54] IMAGE FORMING APPARATUS

[75] Inventor: Kazunori Bannai, Yokohama, Japan

[73] Assignee: Ricoh Company, Ltd., Tokyo, Japan

[21] Appl. No.: 525,107

[22] Filed: May 18, 1990

[30] Foreign Application Priority Data

May 19, 1989 [JP] Japan .................................. 1-124425
Feb. 28, 1990 [JP] Japan .................................. 2-45826

[51] Int. Cl.$^5$ ............................................. G01D 9/42
[52] U.S. Cl. .................................. 346/108; 355/233; 358/296
[58] Field of Search ................ 346/108; 358/296, 300; 355/233, 208

[56] References Cited

U.S. PATENT DOCUMENTS

| 4,400,740 | 8/1983 | Traino et al. | 358/300 X |
| 4,613,877 | 9/1986 | Spencer et al. | 346/108 X |
| 4,922,266 | 5/1990 | Bidner et al. | 346/108 X |
| 4,933,727 | 6/1990 | Mizuma et al. | 355/327 |

Primary Examiner—A. T. Grimley
Assistant Examiner—J. E. Barlow, Jr.
Attorney, Agent, or Firm—Oblon, Spivak, McClelland, Maier & Neustadt

[57] ABSTRACT

An image forming apparatus for forming an image by deflecting a light beam signal modulated by an image signal onto a photoconductive element by a polygonal mirror to electrostatically form a latent image and developing the latent image. A main scanning synchronization detector is located in the vicinity of the photoconductive element for setting up synchronization in the main scanning direction. A displacement detector detects a distance over which the photoconductive element has been displaced over a period of time associated with a subscanning pitch. Correcting control is driven in response to the output signals of the main scanning synchronization detector and displacement detector. The light beam signal is so deflected in the subscanning direction as to correct an error in the subscanning pitch.

4 Claims, 16 Drawing Sheets

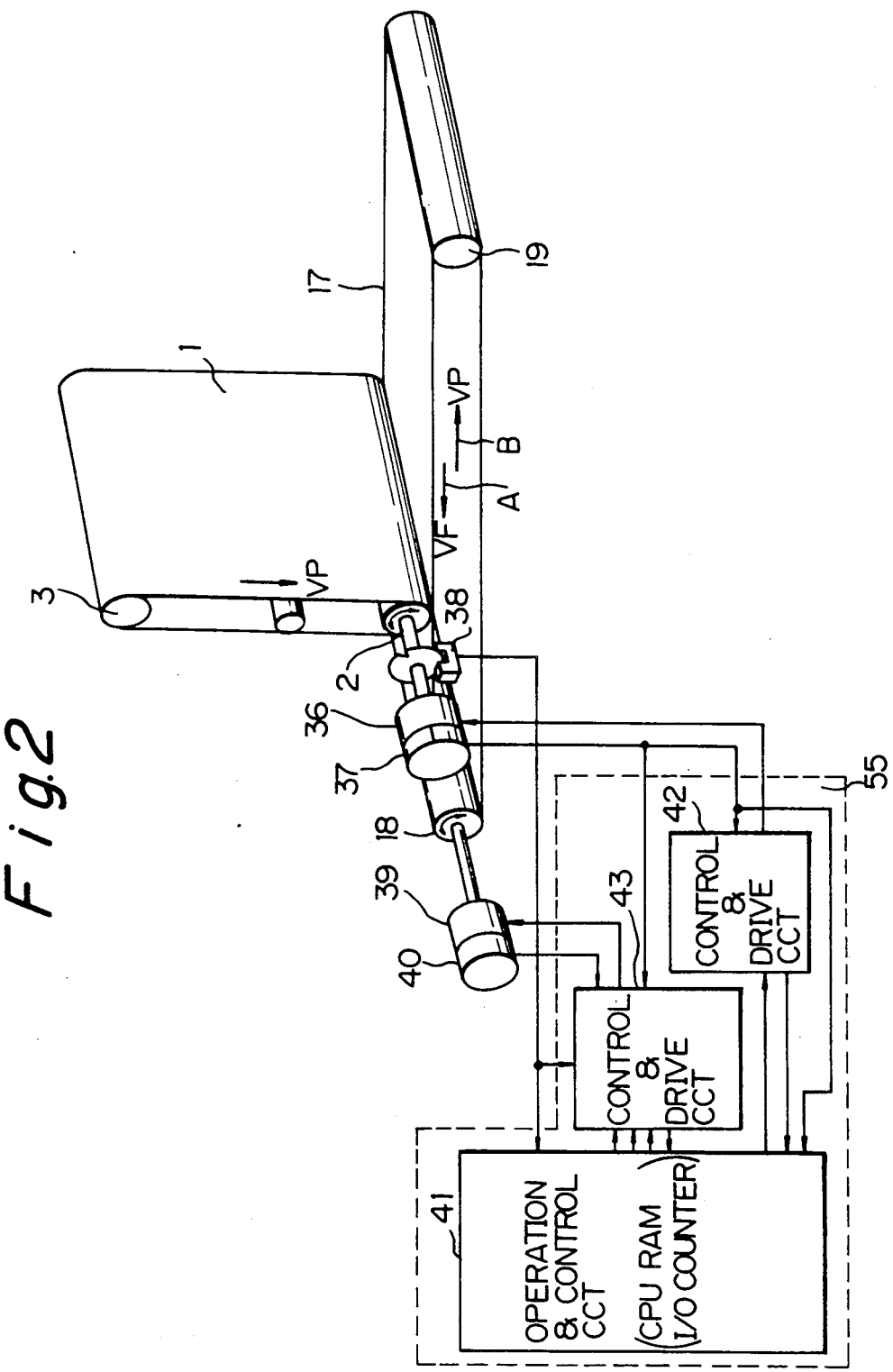

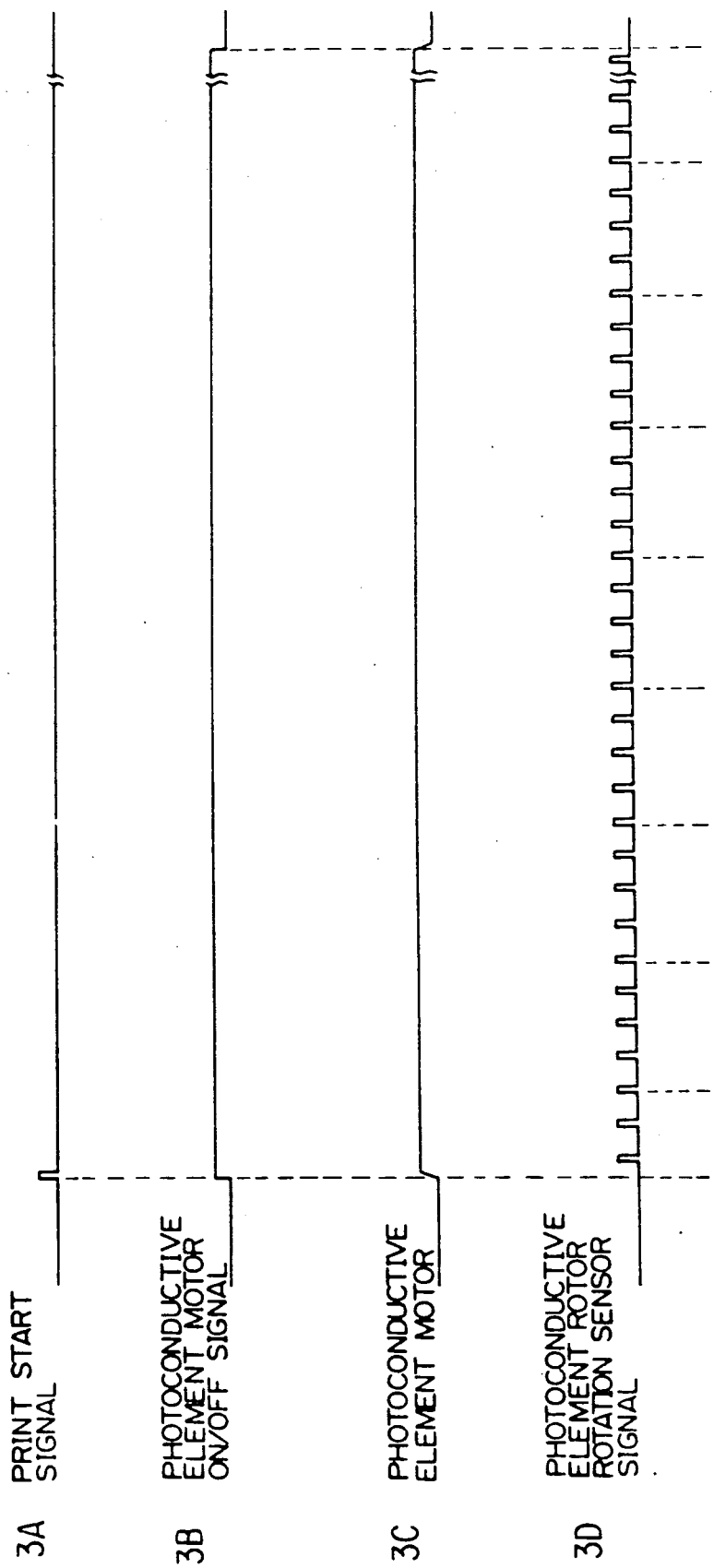

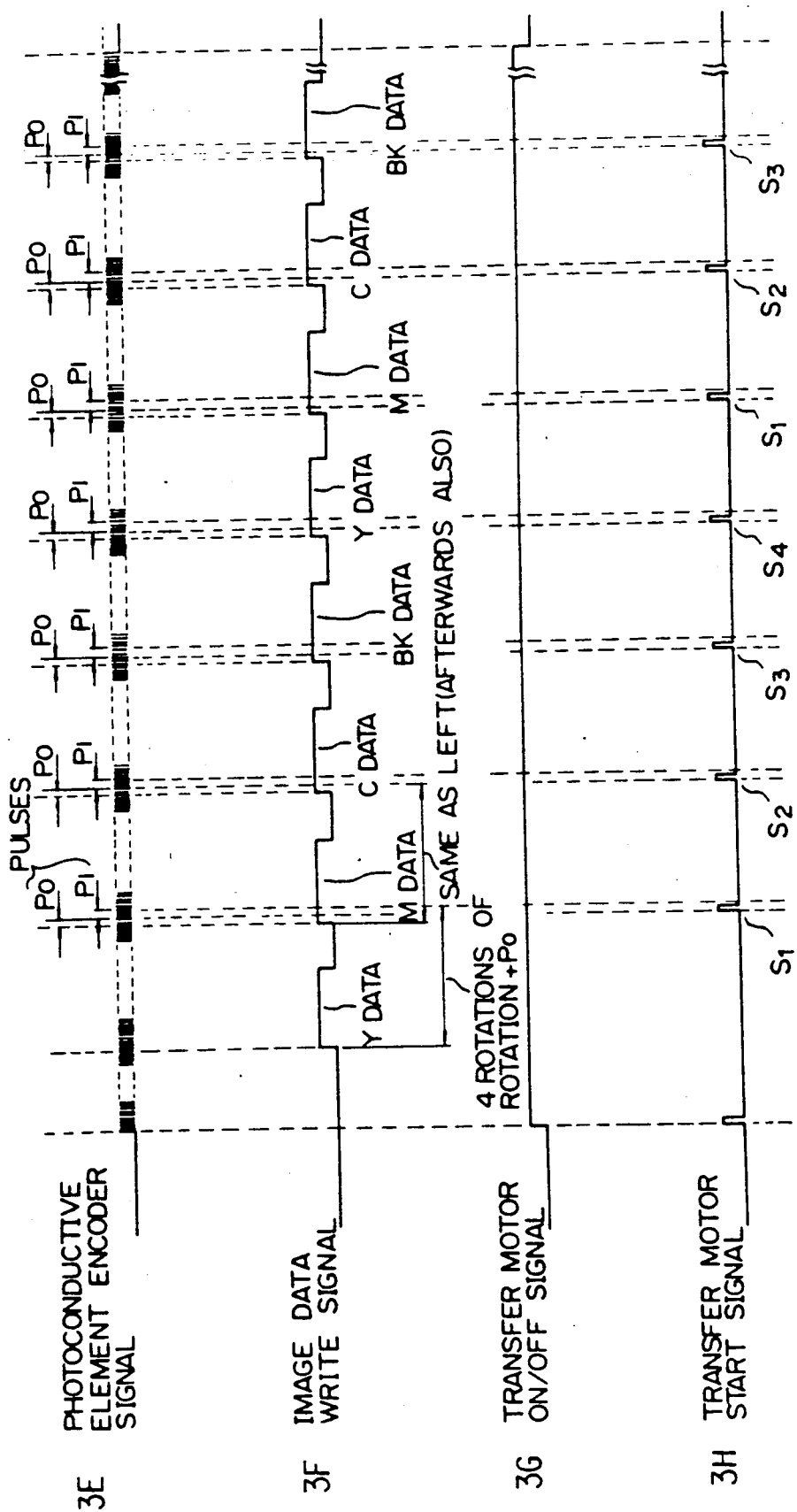

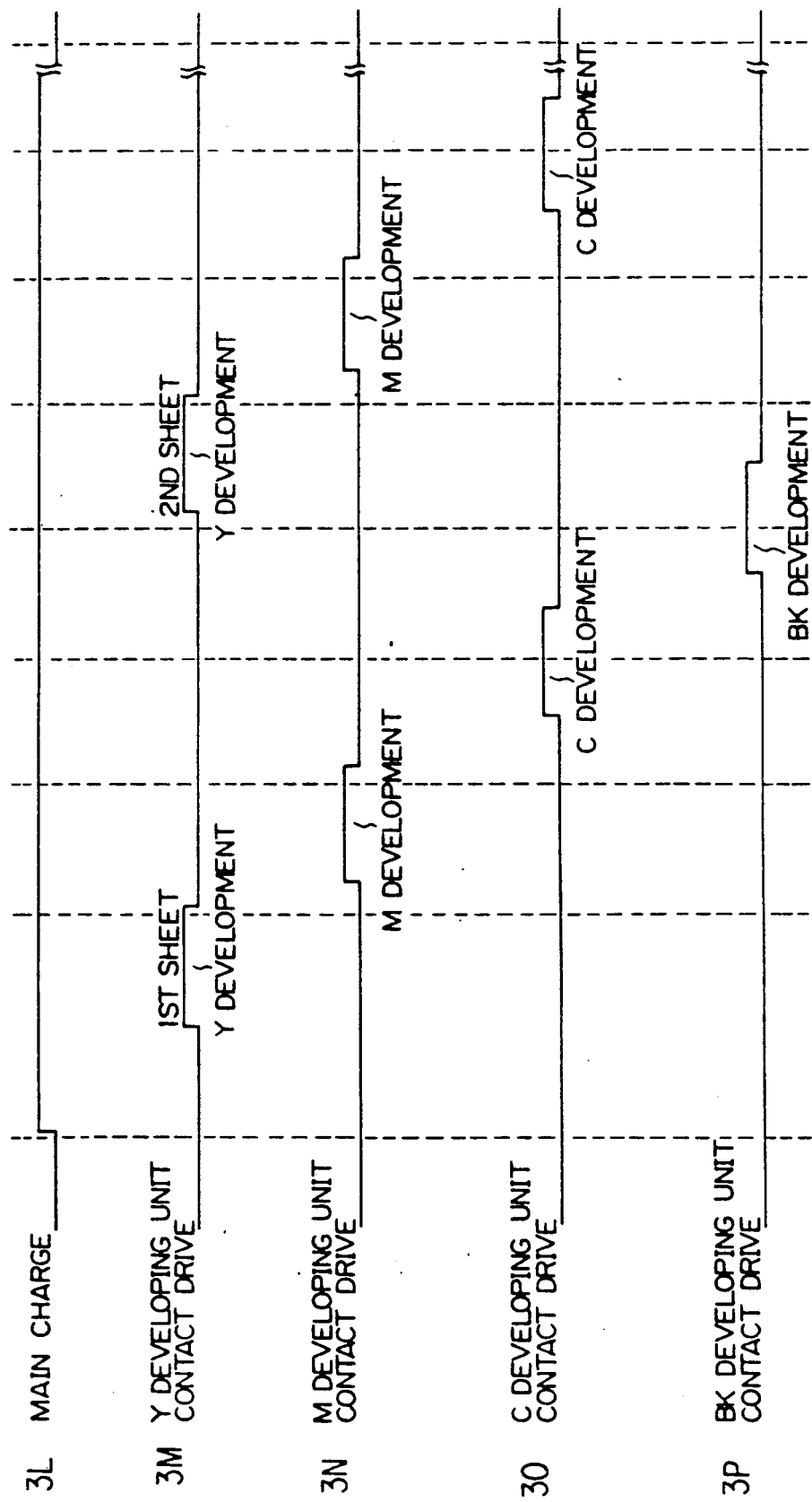

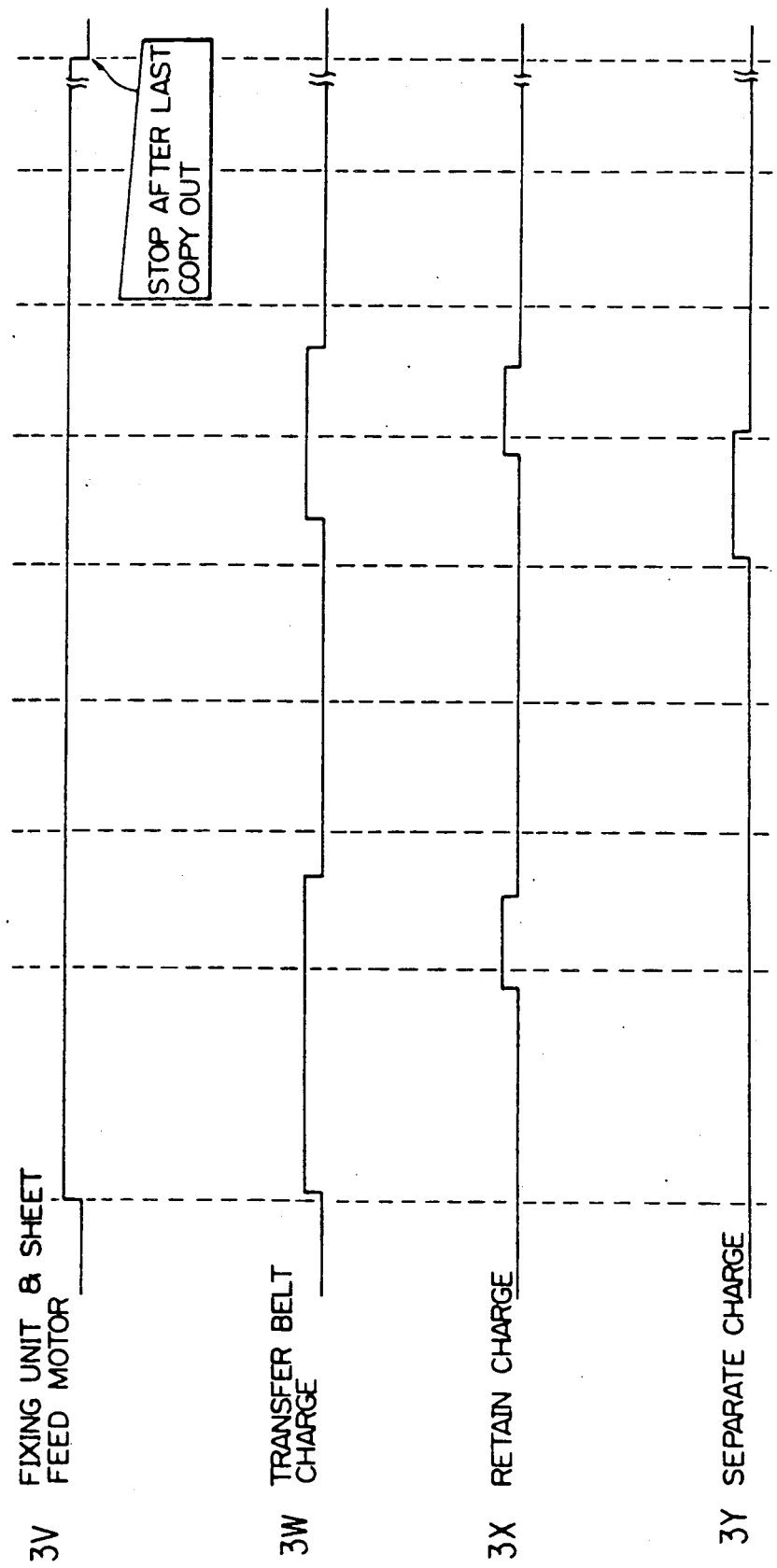

IMAGE FORMING APPARATUS

BACKGROUND OF THE INVENTION

The present invention relates to a copier, printer, facsimile machine or similar image forming apparatus for forming an image by modulating a light beam signal by an image signal, deflecting the modulated light beam signal by a polygonal mirror to irradiate a photoconductive element for thereby electrostatically forming a latent image, and developing the latent image.

With an image forming apparatus of the type described, there is an increasing demand for high-density multi-tone images. Banding of an image in the subscanning direction has been discussed as a critical phenomenon which degrades the quality of images. Banding is ascribable to the irregularities in the configuration of a polygonal mirror, i.e., the irregular angles of the individual mirrors of the polygonal mirror and the fluctuation of the rotation of a photoconductive element. The irregular angles of the individual mirrors cause a beam spot formed by a laser beam on a photoconductive element to vary in position. On the other hand, the fluctuation of the rotation of the photoconductive element causes the pitch in the subscanning direction to vary.

With respect to the banding ascribable to the irregularities in the configuration of the polygonal mirror, an approach for eliminating this problem is disclosed in Japanese Patent Laid-Open Publication (Kokai) No. 91211/1981. The disclosed approach is such that a beam irradiates a mirror surface different from a mirror surface which should be irradiated by a data beam, thereby producing a signal representative of an inclination of the mirror surface beforehand. When the mirror surface of interest has reached a predetermined position where it is to be irradiated by a data beam, the incidence angle of the data beam to the polygonal mirror is controlled on the basis of the inclination signal.

As for the elimination of the banding due to the fluctuation in the rotation of the photoconductive element, some elaborated implementations are taught in Japanese Utility Model Laid-Open Publication No. 193518/1985 and Japanese Patent Laid-Open Publication Nos. 7262/1987, 65275/1986, and 110115/1986. Specifically, Utility Model Laid-Open Publication No. 193518/1985 uses an actuator for mechanically displacing a laser or a collimator lens placed in parallel to the axis of rotation of a polygonal mirror and in synchronism with the rotation of the mirror. Patent Laid-Open Publication No. 7262/1987 senses the angular positions of a photoconductive element and thereby sets the timings for beginning and ending imagewise exposure. Patent Laid-Open Publication No. 65275/1986 discloses a system which optically writes an image on a photoconductive element by an optical writing element in synchronism with the transport of the photoconductive element. Further, Patent Laid-Open Publication No. 110115/1986 proposes a system for rotating, when a laser beam deflected by a polygonal mirror is detected, a photoconductive element by a given angle which is determined by the interval between successive scanning lines.

A problem with the approach of Patent Laid-Open Publication No. 91211/1981 is that the construction is complicated and, moreover, it does not give any considerations to the fluctuation of the rotation of a photoconductive element. The implementation of Utility Model Publication No. 193518/1985 which relies on mechanical displacements is not satisfactory when it comes to a rapid response to speed ripples or other similar problems. The systems of Patent Laid-Open Publication Nos. 7262/1987 and 65275/1986 are not limited to LD arrays and LCD arrays but also impracticable without resorting to complicated circuitry. The scheme of Patent Laid-Open Publication No. 110115/1986 uses gears and a timing belt for controllably driving a photoconductive element and, therefore, it cannot eliminate the fluctuation of the rotation of the photoconductive element.

SUMMARY OF THE INVENTION

It is therefore an object of the present invention to provide an image forming apparatus capable of producing high-quality images by accurately correcting the banding of images in the subscanning direction.

It is another object of the present invention to provide a simple and inexpensive image forming apparatus capable of producing high-quality image stably while correcting the banding of images in the subscanning direction.

It is another object of the present invention to provide a generally improved image forming apparatus.

An image forming apparatus for forming an image by modulating a light beam signal by an image signal, deflecting the modulated light beam signal onto a photoconductive element by a polygonal mirror to electrostatically form a latent image and developing the latent image of the present invention comprises a main scanning synchronization detecting element located in the vicinity of the photoconductive element for setting up main scanning synchronization, a displacement detecting circuit for detecting a distance over which the photoconductive element has been displaced during a period of time associated with a subscanning pitch, and a correcting circuit for correcting an error in the subscanning pitch by deflecting the light beam signal in a subscanning direction.

BRIEF DESCRIPTION OF THE DRAWINGS

The above and other objects, features and advantages of the present invention will become more apparent from the following detailed description taken with the accompanying drawings in which:

FIG. 2 is a view showing a mechanism for driving a photoconductive element and a transfer belt included in the copier of FIG. 1;

FIGS. 3-1, 3-2, 3-3, 3-4, 3-5 and 3-6, are timing charts demonstrating the basic operation of the color copier shown in FIG. 1;

FIG. 4 is a block diagram schematically showing an image forming apparatus embodying the present invention;

FIG. 5 is a fragmentary perspective view of the embodiment shown in FIG. 4;

DESCRIPTION OF THE PREFERRED EMBODIMENTS

To better understand the present invention, a reference will be made to a color copier belonging to a family of image forming apparatuses to which the present invention pertains.

Figure 1:
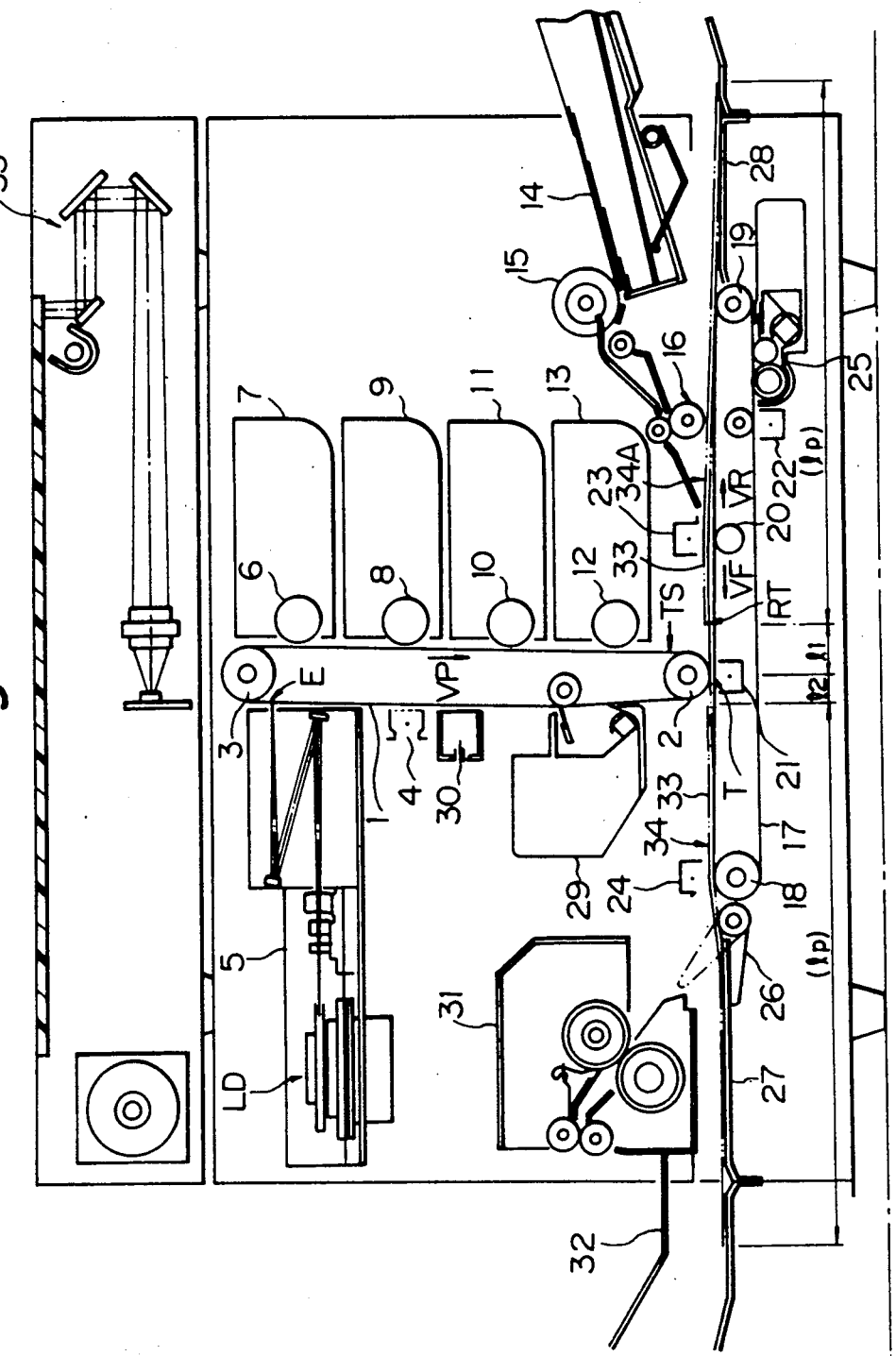
FIG. 1 is a section showing a color copier to which the present invention is applicable.

Referring to FIG. 1, a color copier has a photoconductive element 1, a drive roller 2, a driven roller 3, a main charger 4, a writing unit 5, developing units 7, 9, 11 and 13, a transfer belt 17, a drive roller 18, a drive roller 19, a transfer charger 21, a cleaner 29, a discharger 30, and and image reading device 35. The transfer belt 17 is passed over the drive and drive rollers 18 and 19. A paper cassette 14 is located in the vicinity of one end of the transfer belt 17 which adjoins the drive roller 19. A paper sheet 33 is fed from the paper cassette 14 to the transfer belt 17 by a feed roller 15 and a register roller pair 16. A fixing unit 31, a tray 32, a guide 27 for guiding the leading edge of the paper sheet 33, and a separation charger 24 are disposed in the vicinity of the other end of the transfer belt 17 which adjoins the drive roller 18. The photoconductive element 1 is passed over the drive and driven rollers 2 and 3 and extends perpendicularly to the transfer belt 17. The transfer charger 21 faces the drive roller 2 with the intermediary of the transfer belt 17. The developing units 7, 9, 11 and 13 are located at one side of the photoconductive element 1 and comprise developing rollers 6, 8, 10 and 12, respectively. Located at the other side of the photoconductive element 1 are the main charger 4, writing unit 5, cleaner 29, and discharger 30. The developing units 7, 9, 11 and 13 are assigned to yellow (Y), magenta, (M) cyan (C) and black (BK), respectively.

FIG. 2 shows a mechanism for driving the photoconductive element 1 and transfer belt 17. The mechanism has a drive motor 36 for driving the photoconductive element 1, an encoder 37 associated with the drive motor 36, a rotation sensor 38, a drive motor 39 for driving the transfer belt 17, an encoder 40 associated with the drive motor 39, an operation and control circuit 41, and control and drive circuits 42 and 43. The rotation sensor 38, drive motor 36 and encoder 37 are connected to the drive roller 2. The rotation sensor 38 is connected to the operation and control circuit 41 and control and drive circuit 43. The drive motor 36 is connected to the control and drive circuit 42. The encoder 37 is connected to the control and drive circuits 42 and 43. The drive motor 39 and encoder 40 are connected to the drive roller 18 and to the control and drive circuit 43. The control and drive circuits 42 and 43 are connected to the operation and control circuit 41.

Referring to FIGS. 3-1 to 3-6, the basic operation of the color copier having the above construction will be described. When a print switch, not shown, is turned on, the drive motor 36 begins rotating the drive roller 2 clockwise and thereby causes the photoconductive element 1 to rotate at a linear velocity VP, in a direction indicated by an arrow in FIG. 1 (see 3A). At the same time, the drive motor 39 is rotated forward to move the transfer belt 12 at a linear velocity VF, as indicated by an arrow A in FIG. 2 (see 3G, 3H and 3J). The linear velocities VP and VF are selected to be equal to each other. The discharger 30 discharges the photoconductive element 1, and then the main charger 4 uniformly charges the entire surface of the photoconductive element 1, under the following conditions.

1) The discharger 30 reduces the surface potential of the photoconductive element 1 to substantially zero volt by irradiating or applying corona discharge to the surface of the element 1 which has been cleaned of toner particles by the cleaning unit 29.

2) In the case of a negative-to-positive process, toner particles deposit on the areas of the photoconductive element 1 which have not been charged, so that the charger 4 uniformly charges the entire surface of the element 1.

3) While the main charger 4 effects uniform charging by corona discharge, it produces some ozone due to the discharge. Although ozone decomposes within a short period of time after the discharge as been terminated, it has adverse influence on the surface of the photoconductive element 1 and is apt to prevent an image from appearing clear-cut. In the light of this, a fan or similar implement blows or sucks air at the rear of the main charger 4 so as to eliminate the influence of ozone.

The rotation sensor 38 is mounted on the shaft of the drive motor 2 to generate a single pulse in response to one rotation of the roller 2 (see 3D). When the rotation sensor 38 produces the third pulse, a semiconductor laser LD included in the writing unit 5 is controlled to start optically writing an electrostatic latent image in response to Y image data. Specifically, the color image reading device 35, FIG. 1, reads three color-separated components of light, e.g., blue, green and red components. Image operation processing is executed on the basis of the intensity levels of such color components to produce Y, M, C, BK image data. Use may be made of image data which are outputted by a color facsimile, word processor, personal computer or similar color image processing system, in which case a suitable interface will be used.

The Y, M, C, and BK developing units 7, 9, 11 and 13, respectively, are usually held in positions where their developing rollers 6, 8, 10 and 12 do not contact the surface of the photoconductive element 1. The developing units 7 to 13 each is urged to the left as viewed in FIG. 1 only from the time when a latent image of associated color is about to reach the developing roller thereof to the time when the former has just moved away from the latter, causing the developing roller to contact the surface of the photoconductive element 1 over a predetermined area. At the same time, the developing roller of interest and the various portions which contribute to the development begin to be driven (see 3M to 3P). A latent image representative of a Y image has been formed on the photoconductive drum 1 first, as stated earlier. Hence, the Y developing unit 7 is brought into contact with the photoconductive element 1 and driven to develop the Y image (see 3M). This is followed by an image transferring step. As shown in FIG. 1, at an image transfer station where the drive roller 2 is located, the transfer belt 17 is selectively moved into and out of contact with the photoconductive element 1 by a switching roller 20.

On the start of the printing operation, the transfer belt 17 is driven as indicated by an arrow A in FIG. 2. Subsequently, the switching roller 20 is moved upward to urge the transfer belt 17 against the photoconductive element 1 (see 3T). At a predetermined timing, the paper sheet 33 is fed by the feed roller 15 and then driven by the register roller pair 16 into register with the developed image on the photoconductive element 1. In this instance, a charger 23 deposits a charge of predetermined polarity on the paper sheet 33 (see 3X) to cause it into tight contact with the transfer belt 17, thereby preventing the paper sheet 33 from being dislocated during the image transfer. The switching roller 20 also plays the role of a counter electrode coactive with the charger 23, whereby the arrangement is simplified. The discharger 22 uniformly discharges the entire surface of the transfer belt 17 prior to the transfer of the first color (see 3W). At the same time, a belt cleaner 25 cleans the surface of the transfer belt 17.

At the time when the leading edge of the Y image has reached a position TS preceding a transfer position T by a predetermined distance, a forward rotation start signal $S_1$ is applied to the control and drive circuit 43 for causing the drive motor 39 to rotate forward. It is to be noted that the drive motor 39 has already started rotating forward when the signal $S_1$ arrives and, therefore, simply continues the forward rotation (see 3J). Essentially, the signal $S_1$ appears when the leading edge of the paper sheet 33 has arrived at a position RT which precedes the transfer position T by a distance $l_1$ and when the leading edge of the Y image on the photoconductive element 1 has reached the position TS which also precedes the position T by the distance $l_1$. At this particular time, the the drive roller 2 associated with the photoconductive element 1 has rotated four rotations, and the encoder 37 associated with the drive motor 36 has produced $P_0$ pulses (see 3D, 3E, 3F and 3H), as counted from the Y image data write timing. During such an interval, the photoconductive element 1 has moved from an image writing position E to the position TS.

On the lapse of a period of time $t_1$ since the arrival of the signal $S_1$, the leading edge of the Y signal and that of the paper sheet 33 both have moved over the distance $l_1$ to reach the transfer position T. Then, the transfer charger 21 transfers the Y image to the paper sheet 33. At the time $t_1$, the encoder 37 has produced $P_1$ pulses, and the encoder 40 has produced $PT_1$ pulses (see 3E and 3K). Assuming that the resolutions of the encoders 37 and 40 are the same as each other in terms of the displacement per pulse, then $P_1$ and $PT_1$ are equal to each other; and assumming that their ratio is $\alpha$, then $P_1$ and $PT_1$ are associated with the coefficient $\alpha$. The following description will concentrate on the condition $P_1 = PT_1$.

As the Y image transferring step proceeds, the leading edge of the paper sheet 33 is separated from the transfer belt 17 and moved along a path selector 26, which is positioned as indicated by a solid line, to the guide 27. When the trailing edge of the paper sheet 33 has moved away from the transfer position T by a distance $l_2$, i.e., when the paper sheet 33 has moved over a distance $l_1 + l_p$ (paper size) $+ l_2 (t_1 + t_2$ in terms of time) after the arrival of the forward rotation start signal $S_1$, a reverse rotation signal is produced to reverse the transfer drive motor 39 (see 3I and 3J). At this time, the paper sheet 33 is located at a position indicated by the reference numeral 34 in FIG. 1. Prior to the reversal, the switching roller 20 is lowered to release the transfer belt 17 from the surface of the photoconductive element 1. By the reversal of the motor 39, the transfer belt 17 and paper sheet 33 are quickly returned at a velocity VR (VR is higher than VF) as indicated by an arrow in FIG. 1. Specifically, the belt 17 and sheet 33 are moved to the right in a short period of time $t_3$ over the same distance which they have been moved to the left in the period of time $t_1 + t_2$. During such quick return, the leading edge of the paper sheet 33 is separated from the transfer belt 17 and directed toward a guide 28 which guides the leading edge of the paper sheet 33. The paper sheet 33 which is returned is brought to a stop at a position 34A where its leading edge is in register with the position (RT). The sheet then awaits the transfer of the second image, i.e. M image (time $T_4$).

While the first image or Y image is transferred as stated above, the second image or M image is formed on the photoconductive element 1. Specifically, an electrostatic latent image representative of M image data begins to be formed by the laser LD when the drive roller 2 has rotated an integral number of rotations, four rotations in this case, after the start of Y image writing. The Y developing unit 7 having been held in contact with the photoconductive element 1 is released from the element 1 and deactivated before the area of the element carrying the M image reaches the unit 7. After the Y image area has moved away from the M developing unit 8 and before the M image area reaches it, the M developing unit 8 is brought into contact with the photoconductive element 1 and driven (see 3N) so as to develop the M latent image.

When the leading edge of the developed M image has reached the position TS, i.e., when the photoconductive element 1 has moved over the distance corresponding to four rotations of the drive roller 2 and the $P_0$ output pulses of the encoder 37 after the M image data write timing, a forward rotation start signal $S_2$ is fed to the control and drive circuit 43, in the same manner as the transfer of the Y image. At the same time or slightly later than the forward rotation start pulse $S_2$, the switching roller 20 begins to move upward so that the transfer belt 17 may contact the photoconductive element 1 at least before the leading edge of the paper sheet 33 reaches the position T. At the time $t_1$ as counted from the instant of appearance of the signal $S_2$, the photoconductive element 1 has moved the distance $l_1$ associated with the $P_1$ output pulses of the encoder 37, as during the transfer of the Y image. The paper sheet 33 is accelerated from the zero velocity to the velocity VF ($= VP$) within the period of time $t_1$. Again, the pulses $P_1$ and $TP_1$ appearing during the time $t_1$ after the arrival of the forward rotation start signal $S_1$ associated with the first color are equal to each other. Hence, the leading edge of the paper sheet 33 has moved over the distance $l_1$ at the time $t_1$. It follows that the M image is accurately caused into register with the Y image having been transferred to the paper sheet 33.

This is followed by the transfer of the M image, quick return of the paper sheet 33, C image data writing, C development, C image transfer, quick return of the paper sheet 33, BK image data writing, BK development, and BK image transfer.

The transfer of a BK image and successive steps are effected as follows. To transfer a BK image, the path selector 26 is switched over to a position indicated by a phantom line in FIG. 1. In this condition, the paper sheet 33 undergoing the image transfer is directed toward the fixing unit 31 while being charged by the separation charger 24. Even after the BK image has been transferred up to the trailing edge of the paper sheet 33, the drive motor 39 continuously rotates forward to transport the paper sheet 33 to the left as viewed in FIG. 1. As a result, the paper sheet or color printing 39 is driven out onto the tray 32 (see 3J, 3U, 3V and 3Y). When the trailing edge of the area of the transfer belt 17 assigned to the first color printing has moved away from the discharger 22, the discharger 22 begins to uniformly discharge the belt 17 by corona discharge (see 3W). In a repeat copy mode, after the BK image data has been written for the first paper sheet 33, Y image data is written for the second paper sheet 33 with the paper sheet 33 and belt 17 being controlled in the same manner as during the image transfer to the first paper sheet 33. On the completion of the image transfer, the cleaner 29 removes toner particles remaining on the photoconductive element 1, and then the discharger 30 dissipates the remaining charge from the element 1. Thereafter, the photoconductive element 1 is moved toward the main charger 4. Finally, the last color printing is driven out onto the tray 32, and the photoconductive element 1 and transfer belt 17 are cleaned, discharged, and then brought to a stop.

While the foregoing description has concentrated on the particular order of Y, M, C and BK and the particular arrangement of developing units Y, M, C and BK as named from the top to the bottom, such is only illustrative and not limitative. The individual latent images have been shown and described as being optically written by using the semiconductor laser LD and digitized image data. Alternatively, an optical analog image available with an ordinary electrophotographic copier may be focused to the position E by predetermined timing and position control.

When only two or three of the four color images Y, M, C and BK are to be recorded one above another, the operations of the various sections will be so controlled as to form and transfer them twice or three consecutive times. In the even of monochromatic recording, one of the developing units associated with a desired color is held in contact with the photoconductive element 1 and the transfer belt 17 is held in contact with the element 1, until a desired number of printings have been produced; the path selector 26 is so positioned as to guide the paper sheet 33 toward the fixing unit 31. It follows that in a repeat copy mode the recording speed is increased by 4/3 times in the event of three-color recording, by twice in the event of two-color recording, and four times in the event of monochromatic recording, compared to four-color recording. Of course, the developing colors are not limited to the four colors shown and described and may be replaced with any other colors such as blue, green, and red.

Figure 3:
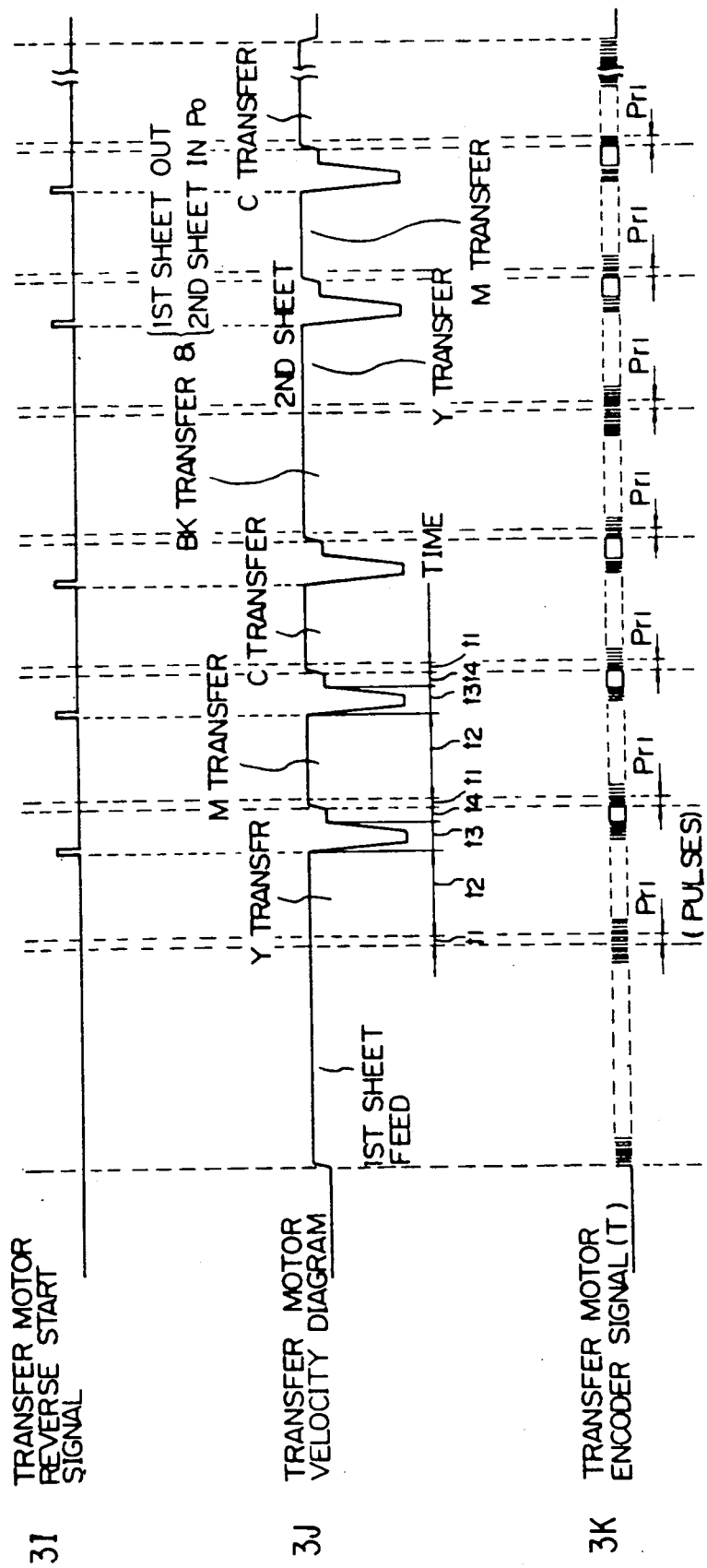
Figures 3, 4, 5:
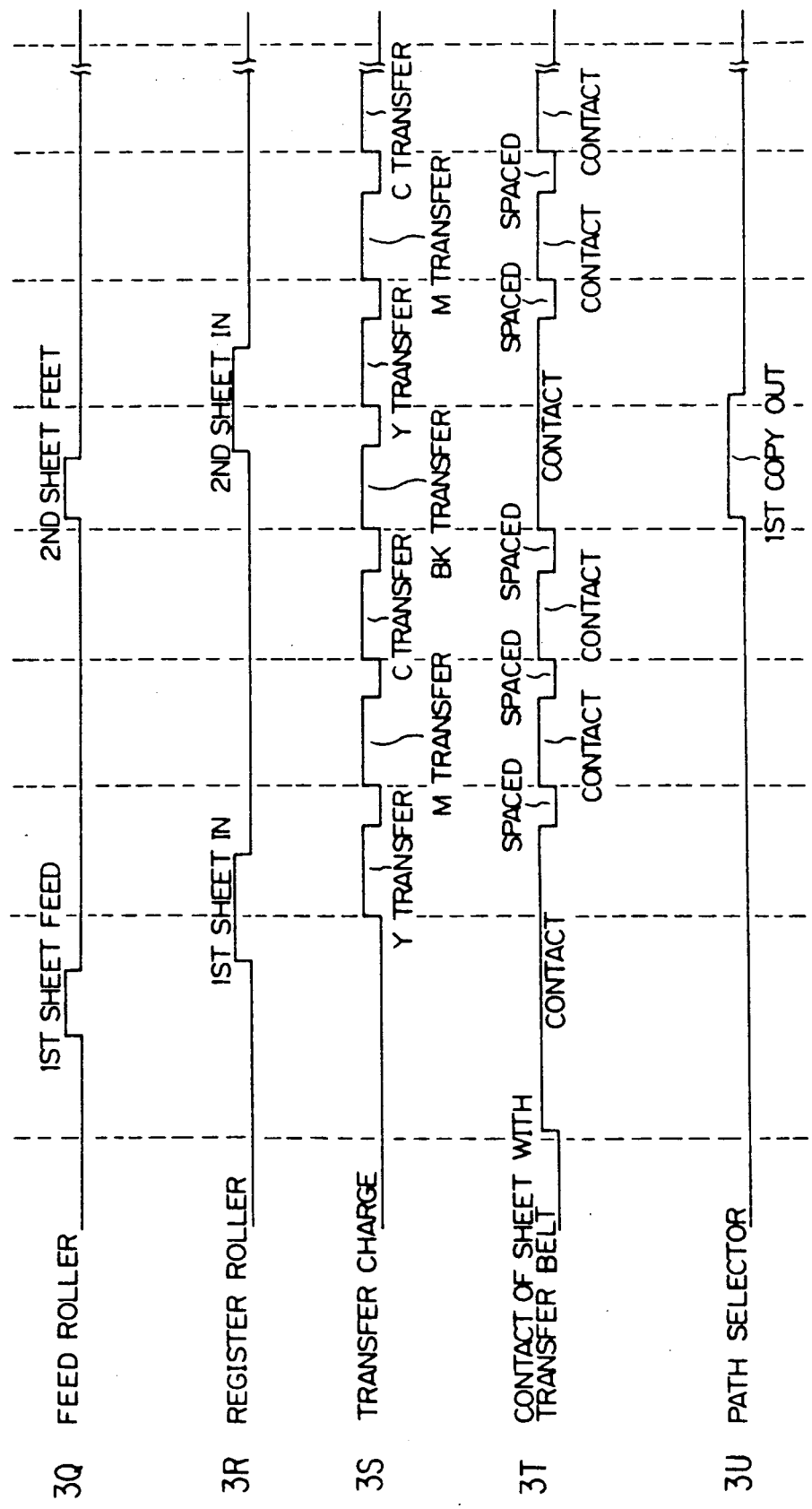
Figure 4:
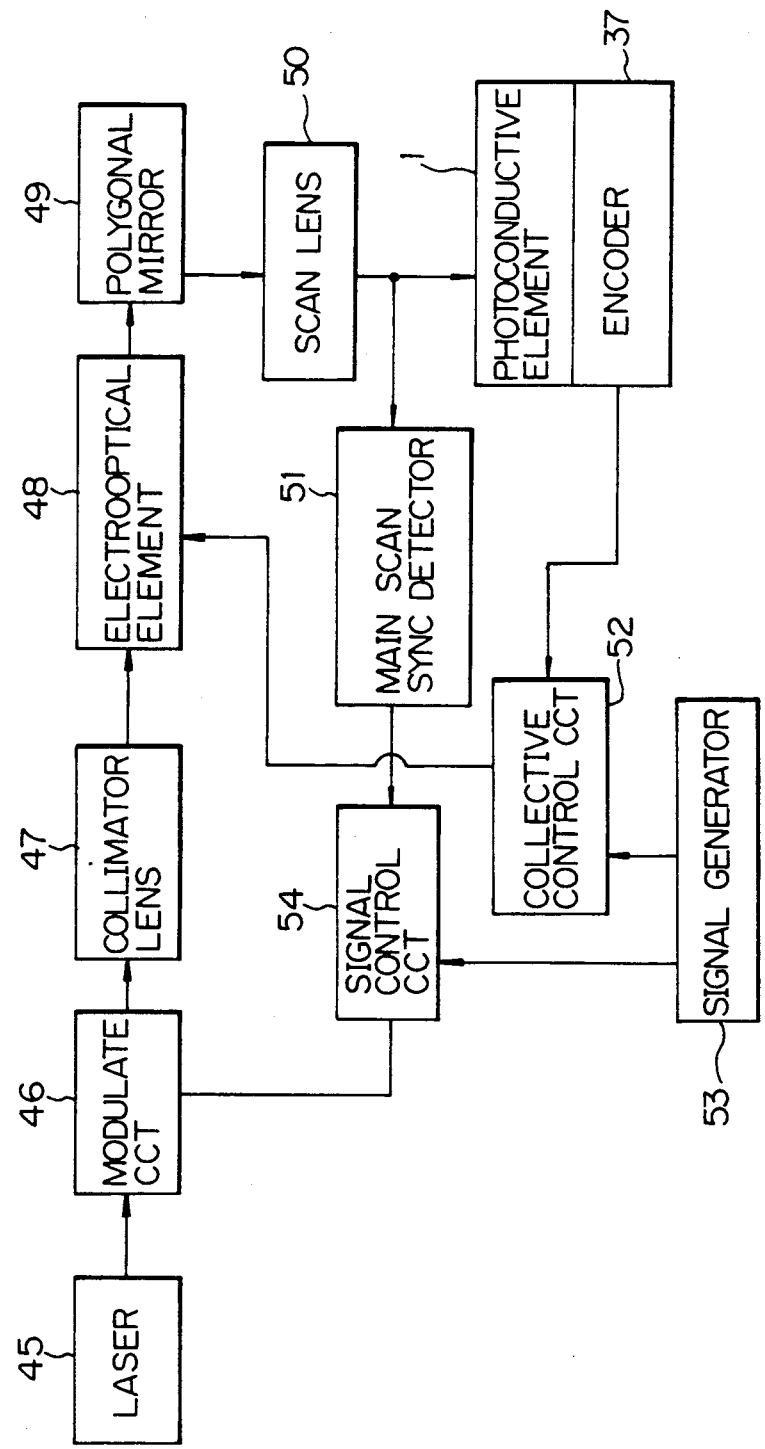
Figure 5:
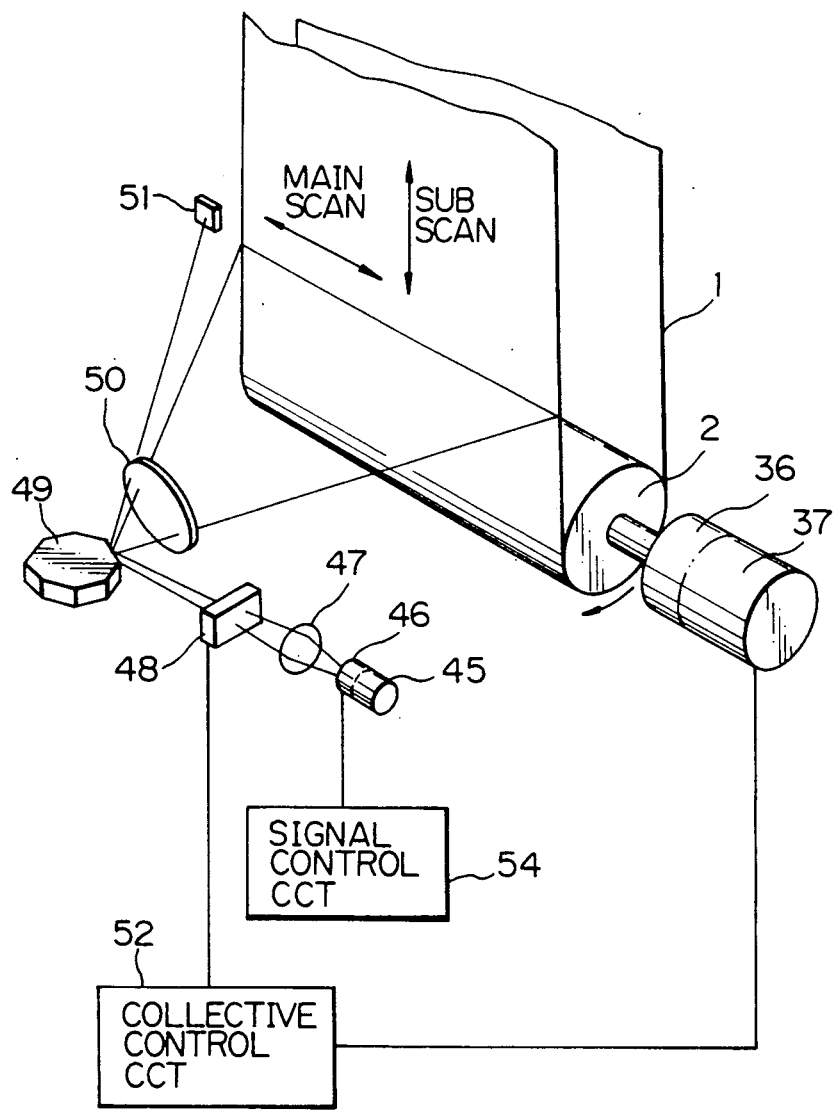

Referring to FIGS. 4 and 5, an image forming apparatus embodying the present invention and applicable to the color copier constructed and operated as stated above is shown. In the figures, the same or similar components and structural elements are designated by like reference numerals, and redundant description will be avoided for simplicity. As shown, the apparatus has the encoder 37 associated with the drive motor 36, a semiconductor laser 45, and a modulating circuit 46. A collimator lens 47 collimates a laser beam issuing from the laser 45 to produce a parallel beam. An electrooptical element 48 plays the role of means for deflecting the parallel beam in the subscanning direction. A polygonal mirror 49 is rotated at a constant speed by a servo motor, not shown. A scanning lens 50 corrects the scanning speed of the laser beam and compensates for the irregularities in the configuration of the polygonal mirror 49. A main scanning synchronization (sync) detector 51 sets up synchronization with respect to main scanning. A collective control circuit 52 controls the electrooptical element 48. A signal generator 53 generates a reference clock. The main scanning sync detector 51 produces a laser beam detection signal. This signal is fed to a signal control circuit 54 together with the reference clock from the signal generator 53. The signal control circuit 54 controls the modulation of the laser beam which is effected by image data.

As shown in FIGS. 4 and 5, the laser beam issuing from the laser 45 is modulated by the image data and a control signal from the signal control circuit 54. The modulated laser beam is transformed into a parallel beam by the collimator lens 47 and then incident to the electrooptical element 48. The output beam of the electrooptical element 48 is incident to and steered by the polygonal mirror 49 to scan the photoconductive element 1 in the main scanning direction, as shown in FIG. 5. In this instance, the scanning lens 50 corrects the scanning speed of the steered beam and compensates for the irregularities in the configuration of the mirror 49, as mentioned previously. As a result, the laser beam forms a latent image representative of a desired image on the photoconductive element 1. Located in the vicinity of the photoconductive element 1, the main scanning sync detector 51 detects the output beam of the scanning lens 50 and delivers a detection signal to the signal control circuit 54. In response to the detection signal and the reference clock, the signal control circuit 54 controls the modulation of the laser beam which is executed by the modulating circuit 46.

The drive motor 36 drives the photoconductive element 1 at a predetermined subscanning pitch in response to the detection signals from the main scanning sync detector 51, as indicated by an arrow in FIG. 5. At the same time, the encoder 37 associated with the drive motor 36 counts the reference clock associated with the intervals of the detection outputs of the main scanning sync detector 51. The collective control circuit 52 compares the count of the reference clock with a reference scanning line pitch. The collective control circuit 52 applies to the electrooptical element 48 a correction signal which is representative of a difference between the actual subscanning pitch and the reference subscanning pitch. In response, the element 48 deflects the laser beam incident to the polygonal mirror 49 in the subscanning direction, thereby correcting the error in the subscanning pitch.

Figure 6A:
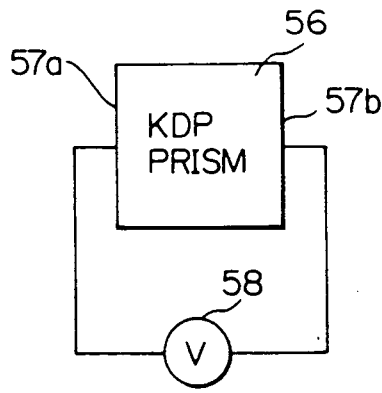
FIGS. 6A and 6B are schematic views representative of an electrooptical element included in the illustrative embodiment.
Figure 6B:
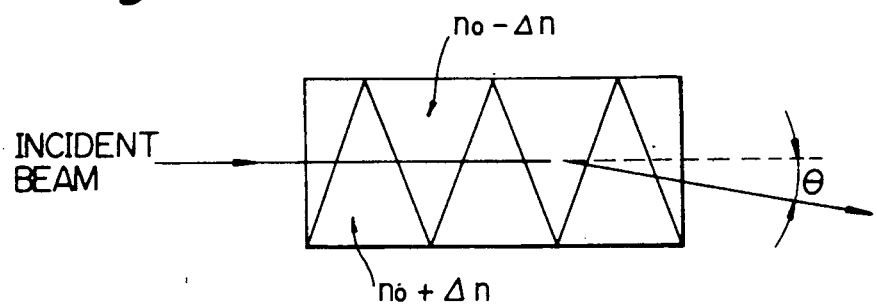

FIGS. 6A and 6B show a specific construction of the electrooptical element 48. In FIG. 6A, there are shown a KDP ($KH_2PO_4$) prism 56, electrodes 57a and 57b, and a power source 58. The refractive index of the KDP prism 56 changes in association with the voltage of the power source 58. As shown in FIG. 6B, assuming that the deflection angle of the incident beam is $\theta$, the distance between the element 48 and the surface to be exposed is L, and the subscanning pitch error is $\Delta P$, then the subscanning pitch error will be corrected if the incident beam is so deflected as to satisfy an equation:

$$\theta = \frac{\Delta P}{L}$$

In the illustrative embodiment, the drive roller 2 has a diameter of 27 millimeters. The control is effected with a resolution of about 5 microns by using the encoder 37 which produces 5,000 pulses per rotation.

Figure 7:
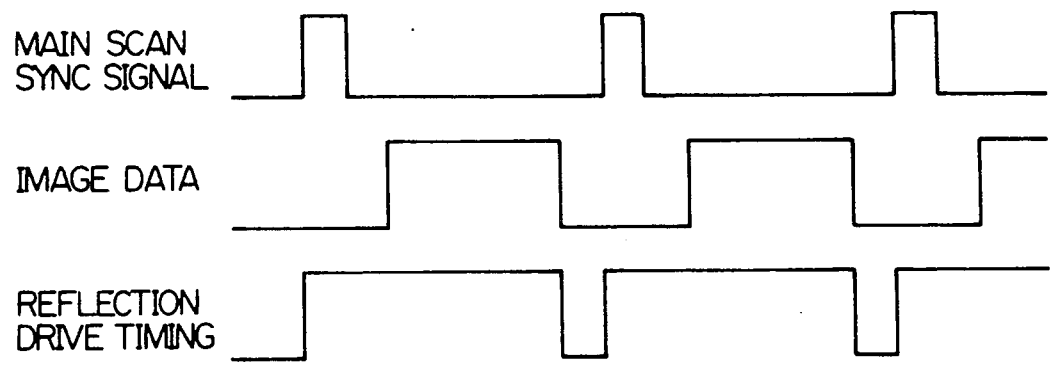
FIG. 7 is a timing chart demonstrating a correcting operation.

As shown in FIG. 7, the drive for deflection begins at the positive-going edge of the main scanning sync signal and ends at the negative-going edge of the image data.

As stated above, in the illustrative embodiment, when a change in the drive of the photoconductive element 1 occurs, the collective control circuit 52 feeds a correction signal to the electrooptical element 48 to cause the latter to deflect the laser beam in the subscanning direction. This is successful in correcting the error in the subscanning pitch ascribable to the change in the rotation of the photoconductive element 1. The irregularities in the configuration of the polygonal mirror 49 are compensated for by adjusting the angular position of the scanning lens 50. Banding due to the irregularities in the configuration of the polygonal mirror 49 and/or the change in the rotation of the photoconductive element 1 is also removed to insure high-quality images. Even when the photoconductive element 1 is driven by a grear-and-belt mechanism, for example, highly accurate correction is achievable. It is not necessary to implement the drive motor 36 by an expensive ripple-free motor. The electrooptical element 48 for deflecting the laser beam needs only a small laser output and is low in production cost, compared to an acoustooptical element (AOM).

While the illustrative embodiment has been shown and described as using a semiconductor laser, it is also practicable with any other laser or even with an LED array or an LCD aray.

Figure 8:
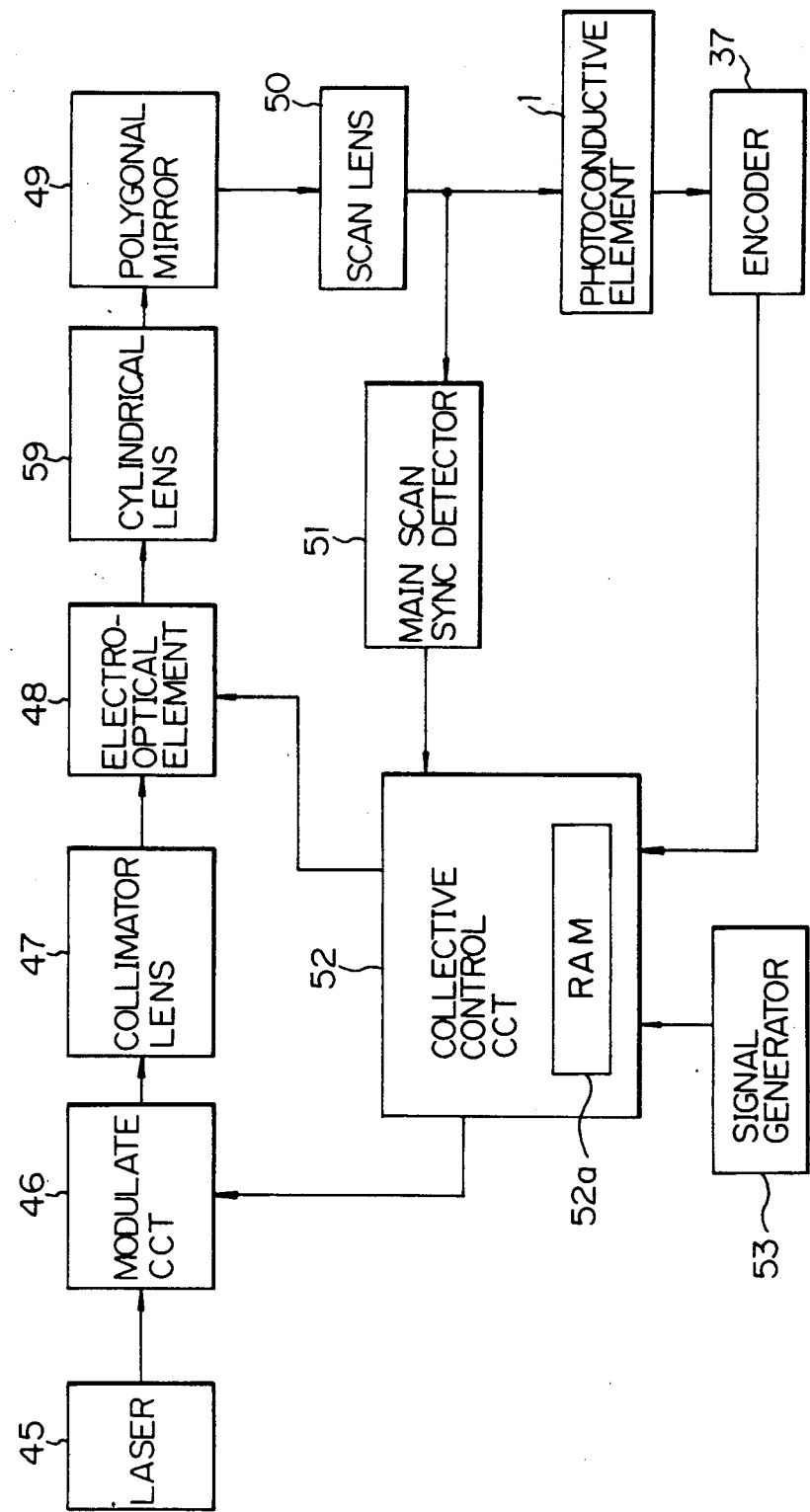
FIG. 8 is a block diagram schematically shown an alternative embodiment of the present invention.
Figure 9:
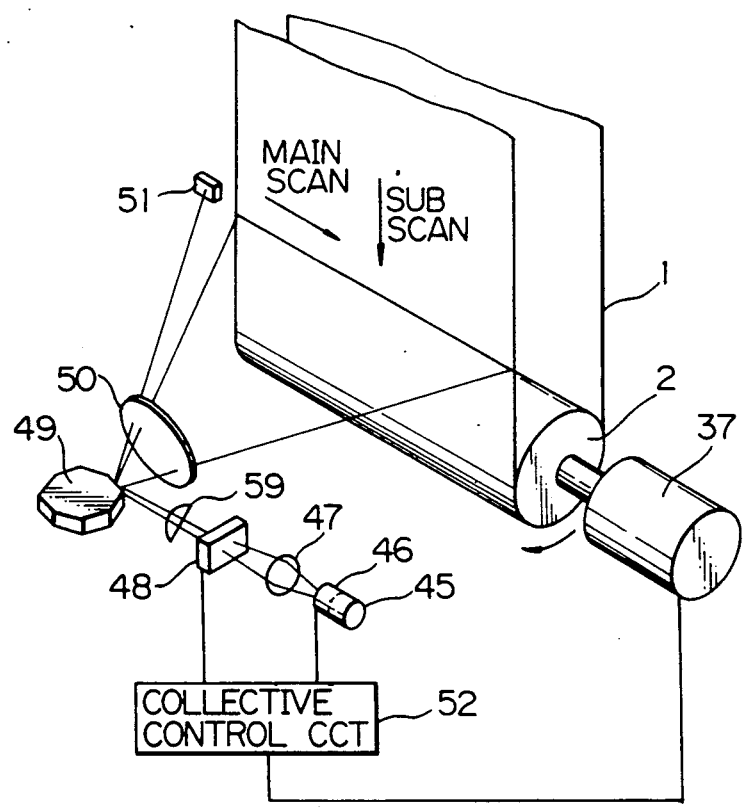
FIG. 9 is a fragmentary perspective view of the alternative embodiment shown in FIG. 8.

Referring to FIGS. 8 to 12, an alternative embodiment of the present invention is shown. FIGS. 8 and 9 correspond to FIGS. 4 and 5, respectively. The alternative element is distinguishable from the previous embodiment in that it has a cylindrical lens 59 and a random access memory (RAM) 52a. The RAM 52a is built in the collective control circuit 52 for storing a set signal, as described later specifically. The operation of this embodiment is essentially the same as the operation of the previous embodiment.

Figure 10:
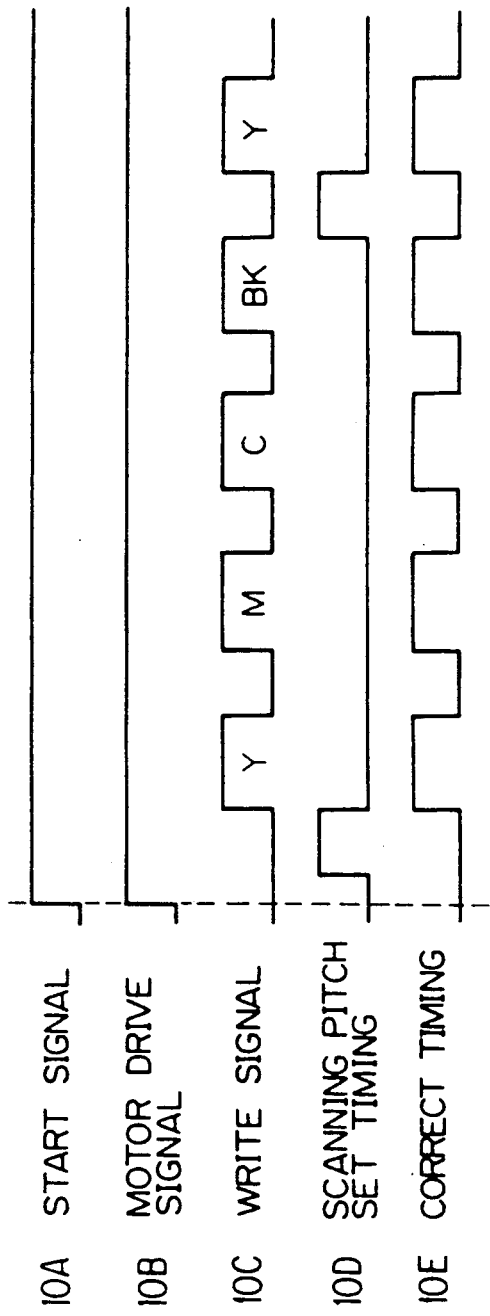
FIG. 10 are timing charts indicative of the basic operation of the alternative embodiment.
Figure 11:
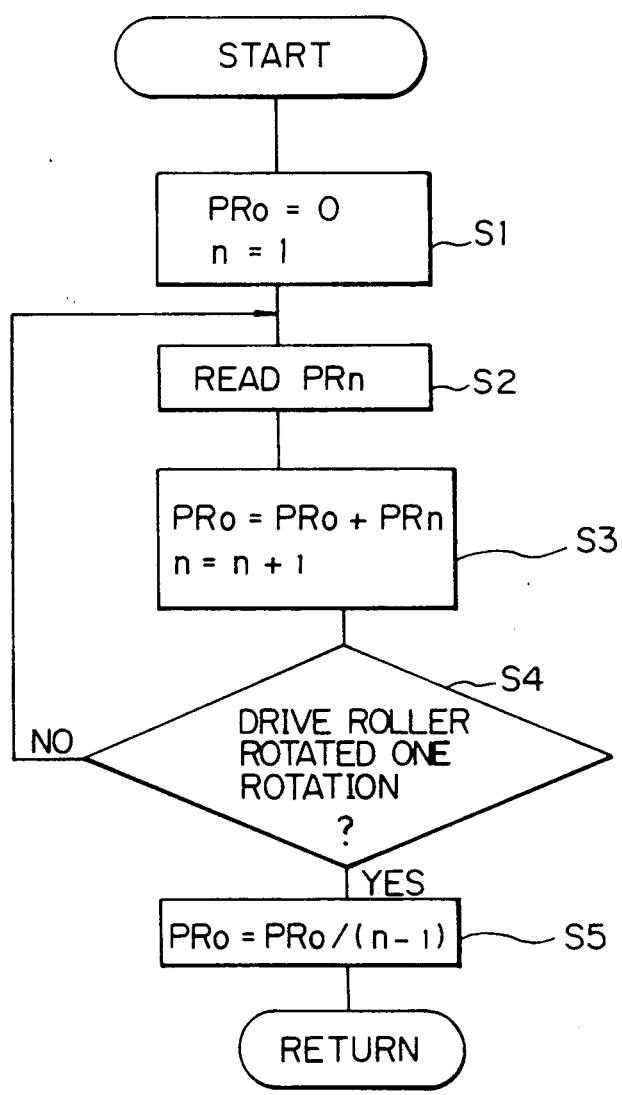
FIGS. 11 and 12 are flowcharts associated with the timing charts of FIG. 10.

How the alternative embodiment corrects banding ascribable to a change in the rotating speed of the photoconductive element 1 will be described. Basically, as shown in FIG. 10, the photoconductive element drive motor 36 and a polygonal mirror drive motor begin to rotate simultaneously with the turn-on of a start key. After the two motors have reached their predetermined speeds, a scanning line pitch setting procedure begins. Specifically, as shown in FIG. 11, the numbers of pulses having appearing during the intervals of main scanning sync signals are added by the encoder 37 which is associated with the drive roller 2, and then the sum is divided by the number of times of detection. When the total number of pulses is selected to correspond to more than one rotation of the drive roller 2 (or that of the shaft of the photoconductive element 1), it is possible to reduce the error ascribable to the eccentricity of the drive roller 2 and to thereby set the number of pulses associated with the set scanning line pitch with accuracy. This prevents the correction value from being offset to one side and thereby substantially eliminates the change in the diameter of a beam spot. More specifically, in FIG. 11, the numbers of pulses ($PR_o$) associated with the set scanning line pitches are added (steps S1 to S3) and, after the drive roller 2 has rotated more than one rotation (YES, step S4), the sum is divided by the number of times of detection (step S5) to set a scanning line pitch. The resulted scanning line pitch is written to the RAM 52a. The number of pulses $PR_o$ representative of the set scanning line pitch is not updated while the same paper sheet is dealt with and is updated every time a single copy is produced, in order that images may be accurately positioned relative to each other.

Figure 12:
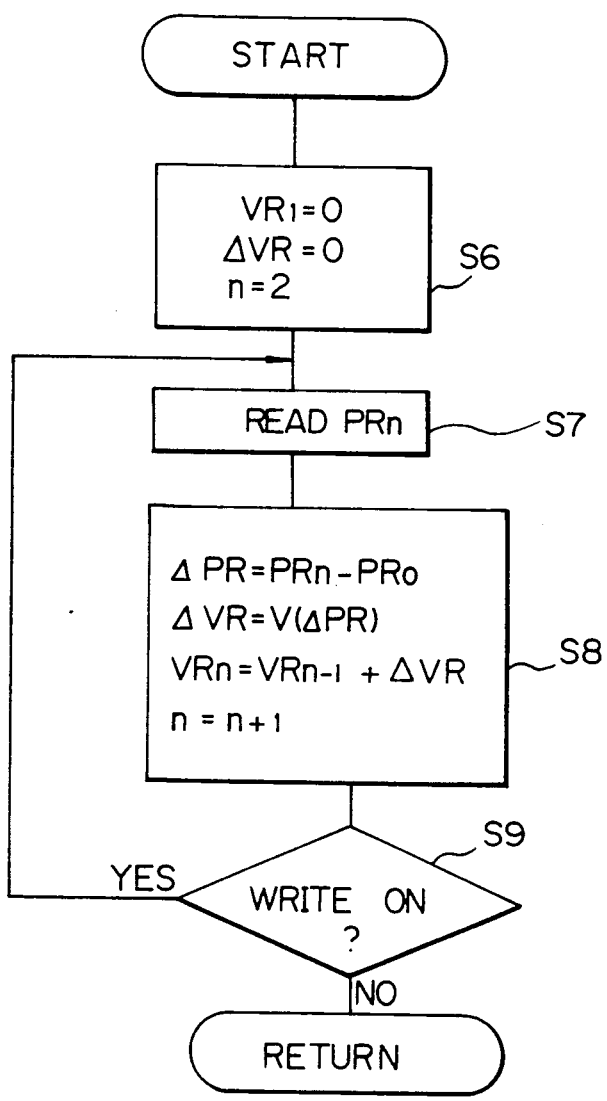

The scanning pitch correction timing is reached simultaneously with the image data writing timing to start on a scanning pitch correction procedure. Specifically, as shown in FIG. 12, the drive voltage for the electrooptical element 48 is initialized (step S6), and the number of pulses $PR_n$ associated with the set scanning line pitch is read out of the RAM 52a (step S7). The number of pulses PRn having been produced by the encoder 52 during the interval of the main scanning sync signals is compared with the number of pulse $PR_o$ associated with the set scanning line pitch, the resulted error is transformed into a drive voltage $\Delta VR$ for driving the electrooptical element 48, the error $\Delta VR$ is added to the previously determined errors, and the total error is used for the correction in the subscanning direction (steps S8 and S9). This is because, since the displacement of the photoconductive element 1 at a given time is the integrated value of the initial velocity and successive velocities, the error just detected has to be added to the total error which is produced by subtracting the displacement associated with the mean velocity from the displacement up to the immediately preceding line.

By the above procedure, the illustrative embodiment is capable of correcting the banding ascribable to the change in the velocity of the photoconductive element 1.

This embodiment is also practicable with the drive roller 2 having a diameter of 27 millimeters, the rotary encoder 37 producing 5,000 pulses per rotation, and a resolution of about 5 microns. If desired, one pulse may be frequency-divided in order to enhance the resolution.

In summary, it will be seen that the present invention provides a simple an inexpensive image forming apparatus which constantly produces high-quality images while correcting banding of images in the subscanning direction, without resorting to expensive drive motors or special drive transmitting parts.

Various modifications will become possible for those skilled in the art after receiving the teachings of the present disclosure without departing from the scope thereof.

What is claimed is:

1. An image forming apparatus for forming an image by modulating a light beam signal by an image signal, deflecting said modulated light beam signal onto a photoconductive element by a polygonal mirror to electrostatically form a latent image, and developing said latent image, said apparatus comprising:

main scanning synchronization detecting means for detecting synchronization of main scanning;

driving means for driving the photoconductive element in response to an output of said main scanning synchronization detecting means representative of synchronization;

detecting means for detecting a distance which the photoconductive element driven by said driving means moves;

comparing means for comparing an output of said detecting means with a predetermined value to output an error signal; and deflecting means for deflecting the light beam signal in a subscanning direction in response to said error signal produced by said comparing means.

2. An apparatus as claimed in claim 1, wherein said correcting means comprises an electrooptical element.

3. An apparatus as claimed in claim 1, wherein said correcting means corrects the error by comparing a detection output of said detecting signal with a set signal stored in a memory and producing a correction signal representative of a sum of a difference between said detection output and said set signal and differences having been detected after the beginning of writing.

4. An apparatus as claimed in claim 3, wherein said set signal is updated every time a single copy is produced.

* * * * *